United States Patent [19]

Brahm

[11] 4,102,209

[45] Jul. 25, 1978

[54] TEMPERATURE COMPENSATED VIBRATING CYLINDER PRESSURE TRANSDUCER

[75] Inventor: Charles B. Brahm, Ellington, Conn.

[73] Assignee: United Technologies Corporation, Hartford, Conn.

[21] Appl. No.: 807,625

[22] Filed: Jun. 17, 1977

[51] Int. Cl.² .............................................. G01L 19/04
[52] U.S. Cl. ........................................ 73/702; 73/708
[58] Field of Search ............................... 73/393, 398 R

[56] References Cited

U.S. PATENT DOCUMENTS

| 3,021,711 | 2/1962 | Arvidson | 73/398 R |
|---|---|---|---|
| 3,199,355 | 8/1965 | Simon-Suisse | 73/393 |

Primary Examiner—Donald O. Woodiel

Attorney, Agent, or Firm—Richard P. Lange

[57] ABSTRACT

A pair of annular rings for a vibrating cylinder pressure transducer are fabricated from material with a high permeability and are disposed on the sidewall of a vibrating cylinder to reduce the effective reluctance of each of the magnetic paths of the drive and pickup coils at high temperature. A thin ring of material is deposited to extend circumferentially around the interior of the cylinder sidewall adjacent the axis of both the drive and pickup coils. In operation, as the temperature of the vibrating cylinder increases causing its permeability to decrease, the rings compensate for the increasing sidewall reluctance maintaining effective reluctance to the drive and pickup coils adequately low so that a signal of a sufficient magnitude is fed back to the drive coil to maintain the system in a self-oscillating condition.

5 Claims, 2 Drawing Figures

TEMPERATURE COMPENSATED VIBRATING CYLINDER PRESSURE TRANSDUCER

BACKGROUND OF THE INVENTION

1. Field of the Invention

This invention relates to an improvement for a vibrating cylinder pressure transducer, and, more particularly, to an improvement which compensates for the decline in the stability of such a pressure transducer as a result of increasing temperature.

2. Description of the Prior Art

Vibrating cylinder pressure transducers are known devices which measure pressure variations in fluids by electrical means. U.S. Pat. No. 3,021,711 issued on Feb. 20, 1962 to G. Arvidson for DEVICE FOR MEASURING PRESSURE OR DIFFERENCE IN PRESSURE OF FLUIDS, describes a transducer which has a pair of electromagnetic coils mounted on a nonmagnetic frame and disposed within a vibrating cylinder. The electromagnetic coils are mutually perpendicular and are transverse to the axis of the vibrating cylinder. A pair of wires lead from each coil through the outer housing of the transducer for coupling to external electrical circuitry. By supplying an electrical current to one of the coils, the cylinder may be set into vibration according to one of its natural vibration modes. As the result of this vibration, an alternating voltage of the same frequency is induced in the second coil. By using an amplifier and feedback to the first coil, a continuously oscillating system can be established about some natural frequency. In measuring the pressure of a gaseous or liquid media, the medium is introduced into the closed area on one side of the cylinder wall. The media pressure acting on the cylinder wall influences the natural frequency of the cylinder and causes it to vary in an amount nearly proportional to the change in pressure. Accordingly, by measuring this variation in frequency with a frequency meter, the pressure acting on the cylinder wall can be determined.

An improved version of this basic vibrating cylinder concept is described in U.S. Pat. No. 3,863,505 issued Feb. 4, 1975 to E. Moffatt, for VIBRATING CYLINDER PRESSURE TRANSDUCER, assigned to the same assignee as the present invention, in which the magnetic drive and pickup coil are disposed outside of the vibrating cylinder. One reason for this configuration is so that the closed integrity of the interior of the vibrating cylinder is improved. By the elimination of passageway for the wires leading to and from the coils within the vibrating cylinder, the hermetic sealing of the interior pressure chamber is enhanced. Positioning of the coils outside of the vibrating cylinder also allows a significant reduction in the overall external dimensions of the transducer since the vibrating cylinder is smaller.

One of the problems with prior art vibrating cylinder pressure transducers, particularly those in which the vibrating cylinder is fabricated from NI-SPAN-C alloy, is that they tend to be inaccurate at high temperatures, i.e., above 250° F. This is because the NI-SPAN-C vibrating cylinder gradually loses its magnetic characteristics as its temperature approaches its curie temperature, the point at which a material in essence loses all of its magnetic qualities. Accordingly, when operating at these higher temperatures, the loss in the permeability and the saturation flux density of the Ni-SPAN-C vibrating cylinder is sufficiently large that the closed loop gain of a self-vibrating system incorporating the vibrating cylinder is drastically reduced. The frequency of the vibrating cylinder becomes unstable and in the extreme condition ceases to oscillate unless some form of temperature compensation has been provided.

SUMMARY OF THE INVENTION

The principal object of the present invention is to provide a vibrating cylinder pressure transducer with improved high temperature response.

According to an aspect of the present invention, a vibrating cylinder pressure transducer is provided with a pair of annular rings of a material which retains its permeability at high temperature. The rings are positioned on the sidewall of the vibrating cylinder and extend around the cylinder circumference adjacent the axis at planar alignment with axis of each coil that the ends of each coil magnet are in close priximity to opposite sides of the ring. Each ring provides a magnetic path between opposite sides of the vibrating cylinder which does not lose its magnetic permeability at high temperature so that the overall path reluctance does not increase in accordance with the decreasing permeability of the vibrating cylinder.

According to a feature of the present invention, the sidewall of a vibrating cylinder in a pressure transducer is coated with a material having a high permeability so that a low reluctance magnetic path is provided between the end of a magnetic core. Since the deposited material completes the magnetic circuit for both the drive and pickup coil, the cylinder itself need not even be fabricated from a magnetic material. Furthermore, since the high permeability material need not be just in the form of annular rings, the present invention can be used with any drive and pickup magnetic coil configuration, i.e. single-ended, U-shaped, etc. and the material can be deposited on the cylinder sidewall to optimize efficiency.

The foregoing and various other features and advantages of the present invention will become more apparent in the light of the following detailed description of a preferred embodiment thereof, as illustrated in the accompanying drawing.

DESCRIPTION OF THE PREFERRED EMBODIMENT

Figure 1:
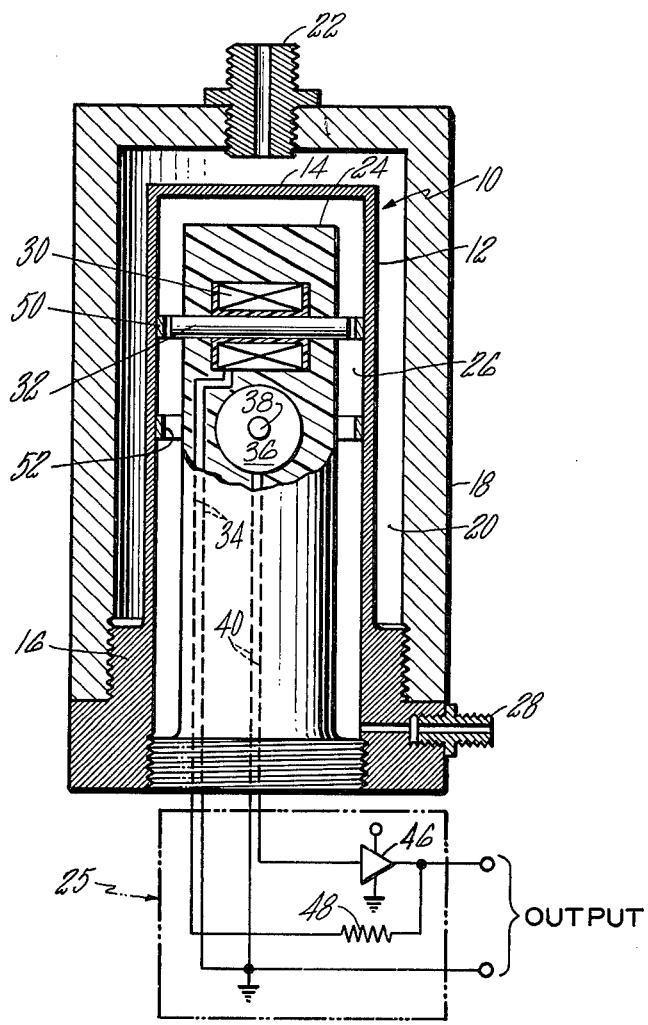
FIG. 1 is an axial sectional view, in elevation, and a schematic circuit illustration of a preferred embodiment of the present invention.

A vibrating cylinder pressure transducer according to the present invention comprises a cylinder 10 with a cylindrical sidewall 12 which is preferably fabricated with a metal having a low temperature coefficient of elasticity, such as NI-SPAN-C. The upper end of the cylinder 10 is closed by an end wall 14 while the lower end includes a thickened base 16 which provides an enlarged portion for mounting the cylinder. The vibrating cylinder 10 is hermetically sealed within the internal cavity of a housing 18 forming an outer pressure chamber 20. Housing 18 is formed from a non-metallic material and is sealed at its lower end against base 16. An inlet 22 is provided through housing 18 so that a gas can be introduced into the outer pressure chamber 20.

A central support 24 of a cylindrical shape and fabricated from a non-metallic material is disposed within cylinder 10 and is sealed against base 16 to form an inner pressure chamber 26, also having a cylindrical configuration. An inlet 28 in base member 16 provides a fluid passageway which communicates with the inner pressure chamber 26 so that a gas can be introduced therein.

A drive device is situated on central support 24 to act up on cylinder 10 and may comprise a driver coil 30 mounted on central support 24 with its axis substantially transverse to that of cylinder 10. Extending through the driver coil 30 is a magnetic core 32, which may be generally cylindrical in shape and sized to extend almost across the diameter of cylinder 12. However, it is sized so that it will be sufficiently spaced apart from sidewall 12 when vibrating so that there will be no contact between the ends of magnet core 32 and sidewall 12. Magnetic core 32 may comprise a permanent magnet, such as an Alnico magnet, situated between a pair of soft iron pole pieces so that the permanent magnet provides a magnetic bias for the magnetic circuit in operation. A pair of wires 34 leads from coil 30 out of center support 24 for coupling to external circuitry 25, described more fully hereinafter.

A pickup device is provided for sensing the movement of cylinder 10 and preferably comprises a pickup coil 36 mounted on central support 24 with its axis also transversed to the axis of cylinder 10. A magnetic core 38, extends through the center of pickup coil 36 and is sized to almost extend across the diameter of cylinder 10. However, in the same manner as before, there is sufficient space between each end of magnetic core 38 and sidewall 12 to prevent contact when vibrating during operation. Magnetic core 38 may also be a permanent magnet, which may be an Alnico magnet, situated between a pair of soft iron pole pieces so that it provides a magnetic bias for inducing an alternating output signal in the pickup coil 36, described in greater detail hereinafter. A pair of wires 40 lead from coil 36 out through core 24 for coupling to the external electrical circuitry 25.

A comprehensive discussion of the nature of a vibrating cylinder pressure transducer is contained in the herebefore described prior art references, and these references should be consulted for an overall understanding of measuring pressures with such transducers. However, for the purposes of the present invention it will be appreciated that in operation cylinder 10 operates in one of its natural vibratory modes, which for simplicity and clarity of explanation will be assumed to be N=4 or that mode creating eight vibratory nodes around the circumference of sidewall 12. An electrical signal whose frequency corresponds to this natural vibratory mode is fed from the external circuitry 25 via wires 34 to the driver coil 36. This signal creates a sinusoidally varying magnetic flux in magnet core 32 which, in turn, drives cylinder 10 in this particular one of its even-lobe vibratory modes. The overall magnetic flux path extends through magnetic core 32 to one end thereof, across one air gap to sidewall 12, around the circumference through the cylinder sidewall 12, and across the other air gap into the opposite end of magnetic core 32. The amount of flux flowing in this path is inversely proportional to the effective reluctance of the path.

The pickup device includes the magnetic core 38 which is oriented normal to both the axis of central support 24 and the magnetic core 32 of the drive device in the case where the cylinder 10 is oscillating at the mode where N=4. As indicated hereinbefore, magnetic core 38 includes a permanent magnet which in essence creates a constant or DC magnetic bias. The overall magnetic path for this bias flux extends through magnetic core 38 to one end thereof, across one air gap to sidewall 12, around the circumference through the cylinder wall, and across the other air gap to the opposite end of magnetic core 38. In the same manner as before, the flux flowing in this path is inversely proportional to the effective reluctance of the path. As the sidewall 12 of the vibrating cylinder moves toward and away from the end of the core 38 while the cylinder 10 vibrates, this changes the air gap lengths and causes the overall reluctance of the magnetic path to vary at the same sinusoidal rate. In turn, the varying magnetic flux through the magnetic core 38 induces an electrical voltage in the coil 36 whose magnitude is directly proportional to the rate of change of flux flowing in the magnetic circuit, this frequency being the same as that of the vibrating cylinder. This signal is then presented to the external circuitry 25 via wires. 40.

In external circuitry 25, this signal is amplified by amplifier 46 and a portion of the signal is fed back through feedback resistor 48 to the input leads 34 and the driver coil 30 so that the natural vibration of the cylinder 10 is reinforced by the flux created by this fed back signal, thereby compensating for inherent friction loss. By this method, once in oscillation the vibrating cylinder 10 will continue to oscillate rather precisely at this frequency until influenced by an external stimulus.

Once again the prior art references should be consulted for a more comprehensive discussion of the procedure for measuring pressure with a vibrating cylinder pressure transducer, but with regard to the present invention a change of fluid pressure in either the outer pressure chamber 20 or the inner pressure chamber 26 results in a different pressure differential across sidewall 12 and this, in turn, changes the frequency of cylinder 10. Since this frequency corresponds to the frequency of the electrical signal in external circuitry 25, by monitoring the frequency of the output signal this change in fluid pressure can also be monitored.

However, one of the problems with prior art vibrating cylinder transducers, particularly those in which the vibrating cylinder is fabricated from NI-SPAN-C, is that they are not accurate at high temperatures, i.e., above 250° F. In this temperature range the Ni-SPAN-C is approaching its curie temperature, which is approximately 350° F, and the material loses its permeability. This loss in permeability increases the effective reluctance of the magnetic paths through which the flux from both the drive coil 30 and the pickup coil 36 must pass. As the material forming vibrating cylinder 10 approaches its "non-magnetic" state, the reluctance in the magnetic path associated with the pickup coil 36 becomes so high that the magnitude of output signal generated in pickup coil 36 falls off significantly. In addition, the reluctance of the drive coil magnetic path causes the force exerted by the drive coil on sidewall 12 to be reduced. As a result of these combined effects, the magnitude of the feedback signal also declines until oscillation can no longer be sustained.

Figure 2:
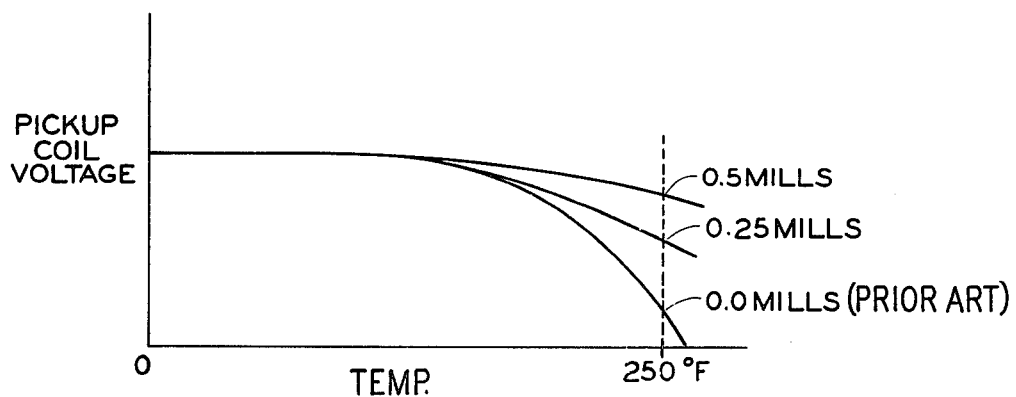
FIG. 2 is an illustration of a graph depicting a comparison of transfer function of a vibrating cylinder pressure transducer according to the present invention compared with prior art transducers.

Still referring to FIG. 1, according to the present invention, a material having a high permeability is disposed or otherwise positioned on the sidewall 12 of the cylinder by one of the well-known methods such as electroplating, vapor deposition, hot dipping, molten spraying, electroless deposition, adhesive bonding or the like adjacent the ends of the driver magnetic core 32 and the ends of the pickup magnetic core 38. In preferred form, this material is deposited on the inside of the sidewall 12 in the form of an annular ring 50 which extends circumferentially around the cylinder adjacent the axis of the magnetic core 32. A similar ring 52 is disposed on the inside of the sidewall 12 adjacent the pickup means and it also extends circumferentially around the cylinder wall. The rings 50 and 52 may be fabricated from a material with a high permeability, such as cobalt, which has a high saturation flux density, a relatively high curie temperature, i.e., above 700° F, and is reasonably resistant to corrosion. It has been found that a thickness of between 0.5 mils and 0.25 mils is sufficient to provide a magnetic path with a sufficiently low reluctance at high temperature, and yet it is thin enough to not constrain the movement of the cylinder sidewall 12 by introducing damping to the vibration of the cylinder 10. Referring now to FIG. 2, this graph illustrates the output signal magnitude in response to a constant magnitude input signal for two different thicknesses of the rings compared with a prior art vibrating cylinder pressure transducer without rings. It will be noted that temperature range over which a signal is available for maintaining self-oscillation is extended by the deposit of the rings.

It should also be understood that in accordance with the present invention the high permeability material need not necessarily be configured as annular rings on the sidewall of the vibrating cylinder. For example, with Ni-SPAN-C any high permeability material which is disposed either inside or outside of sidewall 12 between the ends of the cores lowers the reluctance to either the drive coil or the pickup coil at high temperature. Since this lower reluctance improves the flux carrying capability of the pathway, the system is maintained in a self-oscillating condition over a wider temperature range.

Other magnetic core configurations could also be used in conjunction with the present invention. For example, U-shaped magnetic drive and/or pickup core could be disposed horizontally or vertically either inside or outside the sidewall of the vibrating cylinder. In that case, the high permeability material would extend along the sidewall between the points adjacent the ends of the poles, preferably in a straight line. While it is desirable to connect the sidewall areas adjacent the core poles, any distance would reduce the reluctance seen by the pickup and drive coil at high temperature, thus extending the temperature range of self-oscillation.

Furthermore, it will be appreciated that a material with a high permeability, other than cobalt, could also be deposited on the sidewall 12 to decrease the reluctance of the path through the cylinder 10 at high temperatures. Other suitable material includes nickel, iron and alloys thereof.

A particular advantage of the present invention is that it can be used with a vibrating cylinder fabricated from any type of suitable material, even those which have a low permeability or are in essence "non-magnetic". For example, the vibrating cylinder 10 could be fabricated from a quartz or glass material, or for that matter, any other material which has a natural vibratory mode. Of course, the ring would necessarily be somewhat thicker to provide the low reluctance magnetic path since the flux must be carried totally by the rings.

Thus, although the invention has been shown and described with respect to a preferred embodiment thereof, it should be understood by those skilled in the art that various other changes and omissions in the form and detail thereof may be made therein without departing from the spirit and the scope of the invention.

Having thus described a typical embodiment of my invention, that which I claim as new and desire to secure by Letters Patent of the United States is:

1. A vibrating cylinder pressure transducer for measuring the pressure of a fluid, comprising:
   a housing having an internal cavity forming an outer pressure chamber;
   a cylinder disposed within said cavity and sealed with respect thereto, said cylinder having sidewall, which vibrates in operation and an end wall, defining an inner pressure chamber;
   drive means for creating magnetic flux to act upon said sidewall of said vibrating cylinder;
   pickup means disposed adjacent said sidewall for sensing movement of said vibrating cylinder; and
   means having a high permeability at high temperature disposed on the sidewall of said vibrating cylinder adjacent said drive and pickup means for providing a low reluctance magnetic path at high temperatures.

2. Apparatus according to claim 1, wherein said drive means comprises a coil having a magnetic core extending therethrough, said magnetic core being mounted to extend transverse to the axis of said cylinder, and wherein said means having a high permeability at high temperatures is an annular ring extending circumferentially around the cylinder sidewall adjacent the axis of said magnetic core.

3. Apparatus according to claim 1, wherein said pickup means comprises a coil having a magnetic core extending therethrough transverse to the axis of said cylinder, and wherein said means having a high permeability is an annular ring extending circumferentially around the sidewall of said vibrating cylinder adjacent the axis of said magnetic core.

4. Apparatus according to claim 1, wherein said means having a high permeability is a cobalt ring having thickness of between 0.5 mils and 0.25 mils.

5. Apparatus according to claim 1, further including an external circuit coupled to said pickup means and said drive means, and said pickup means having a coil providing signal in response to the movement of said cylinder to said external circuit, and whereby said external circuit provides a feedback signal to said drive means having a frequency substantially corresponding to that sensed by said pickup means for maintaining a self-oscillating system.

* * * * *